US006941030B2

(12) United States Patent
Kakutani et al.

(10) Patent No.: US 6,941,030 B2
(45) Date of Patent: Sep. 6, 2005

(54) CHARACTER-RECOGNITION PRE-PROCESSING APPARATUS AND METHOD, AND PROGRAM RECORDING MEDIUM

(75) Inventors: Hiroshi Kakutani, Ishikawa (JP); Yasuharu Inami, Ishikawa (JP)

(73) Assignee: PFU Limited, Ishikawa (JP)

( * ) Notice: Subject to any disclaimer, the term of this patent is extended or adjusted under 35 U.S.C. 154(b) by 682 days.

(21) Appl. No.: 09/889,089

(22) PCT Filed: Nov. 30, 2000

(86) PCT No.: PCT/JP00/08452

§ 371 (c)(1),
(2), (4) Date: Oct. 3, 2001

(65) Prior Publication Data

US 2002/0126904 A1 Sep. 12, 2002

(30) Foreign Application Priority Data

Nov. 30, 1999 (JP) .......................................... 11/338902

(51) Int. Cl.[7] ................................................ G06K 9/36
(52) U.S. Cl. ...................................... 382/290; 382/229
(58) Field of Search ................................ 382/290, 289, 382/229

(56) References Cited

U.S. PATENT DOCUMENTS

| | | | | | |
|---|---|---|---|---|---|
| 5,001,766 | A | * | 3/1991 | Baird | 382/290 |
| 5,311,607 | A | | 5/1994 | Crosby | |
| 5,321,770 | A | * | 6/1994 | Huttenlocher et al. | 382/174 |
| 6,084,988 | A | * | 7/2000 | Kanno et al. | 382/289 |
| 6,332,046 | B1 | * | 12/2001 | Fujimoto et al. | 382/289 |
| 6,683,983 | B1 | * | 1/2004 | Shen et al. | 382/168 |

* cited by examiner

*Primary Examiner*—Jon Chang

(57) ABSTRACT

A character-recognition pre-processing apparatus includes extraction means for extracting an image of a character string to be subjected to character recognition; setting means for setting the smallest rectangle that surrounds the character string image extracted; specifying means for specifying the position of each character within the smallest rectangle set by the setting means; detection means for detecting, at each character position specified, the shortest distance between a character region and the lower edge of the smallest rectangle, and the shortest distance between the character region and the upper edge of the smallest rectangle; and judgment means for judging whether the character string extracted is in an upright state or an inverted state, on the basis of variations in the two shortest distances detected.

7 Claims, 16 Drawing Sheets

PPP LIMITED
Howard Brown
Project Manager,Software Research

Phone: (999) 999-9999
999 Airport Parkway,Suite 999      Fax: (000) 000-0000
San Jose,CA 99999      howard@pppca. com

| NAME | COMPANY NAME | SECTION | POSITION | PHONE NUMBER | FAX | MAIL ADDRESS | ADDRESS |
|---|---|---|---|---|---|---|---|
| xxxx | xxxxx | xxx | xxx | xxx | xx | xxx | xxxxxxxxx |
| xxxxx | xxxxx | xxx | xxx | xxx | xx | xxx | xxxxxxxx |
| xxxx | xxxxx | xxx | xxx | xxx | xx | xxx | xxxxxxxx |
| . . . . . . . . | . . . . . . . . . | . . . . . . . . | . . . . . . . | . . . . . . . | . . . . . . | . . . . . . | . . . . . . . . |

PPP LIMITED
Howard Brown
Project Manager, Software Research

999 Airport Parkway, Suite 999
San Jose, CA 99999

Phone: (999) 999-9999
Fax: (000) 000-0000
howard@pppca.com

CHARACTER-RECOGNITION PRE-PROCESSING APPARATUS AND METHOD, AND PROGRAM RECORDING MEDIUM

TECHNICAL FIELD

The present invention relates to a character-recognition pre-processing apparatus and method and to a program recording medium. Particularly, the present invention relates to a pre-processing apparatus and method for character recognition which are adapted to detect the orientation of a character string to be subjected to character recognition, to thereby determine whether the character string is in an upright state or in an inverted state, as well as to a program recording medium which stores a program used for realization of the apparatus. More particularly, the present invention relates to a pre-processing apparatus and method for character recognition which can perform the above detection operation at high speed and with high accuracy when English characters or like characters are processed, as well as to a program recording medium which stores a program used for realization of the apparatus.

BACKGROUND ART

Characters carried on, for example, a document are recognized through sequential performance of the steps of extracting a character string to be subjected to character recognition, detecting the orientation of a character string to be subjected to character recognition, to thereby determine whether the character string is in an upright state or in an inverted state, and segmenting the character string into individual characters so as to perform character recognition. In order to enable recognition of characters carried on, for example, a document at high speed and with high accuracy, there has been demanded a technique for enabling performance of the above-described orientation detection processing at high speed and with high accuracy.

Conventionally, the following method has been used in order to detect the orientation (upright or inverted) of a character string. That is, first, character recognition is performed on the assumption that the character string is in an upright state; an evaluation value (number of points) in relation to the recognition result of each character is obtained, and an average or a like value of the evaluation values of the respective characters is calculated in order to obtain an overall evaluation value. Subsequently, character recognition is performed on the assumption that the character string is in an inverted state (rotated by 180 degrees); an evaluation value in relation to the recognition result of each character is obtained, and an average or a like value of the evaluation values of the respective characters is calculated in order to obtain an overall evaluation value. Subsequently, on the basis of these two overall evaluation values, character recognition which provides a higher recognition rate is specified in order to detect whether the character string is in an upright state or in an inverted state.

As described above, the conventional technique employs a configuration such that the orientation (upright or inverted) of a character string is detected through character recognition. Therefore, when the conventional technique is employed, a problem of increasing the load imposed on a CPU (Central Processing Unit) arises.

Further, the conventional technique involves a problem such that detection accuracy decreases when characters to undergo character recognition are English characters (letters) or like characters. That is, English characters include characters which assume the same (or substantially the same) shape even when rotated by 180 degrees, such as "H," "I," "N," "O," "S," "X," and "Z." Further, as can be seen in the case of "M" and "W," English characters include characters which, when rotated by 180 degrees, assume shapes very similar to those of other characters. Accordingly, due to the above-described properties, English characters provide relatively high recognition rate, even when the orientation of a character string is detected erroneously. Therefore, the conventional technique encounters a problem of the accuracy in detecting the orientation of a character string decreasing when characters to be recognized are English characters or other character having the above-described properties.

The present invention was accomplished in view of the foregoing, and an object of the present invention is to provide a character-recognition pre-processing apparatus which can detect the orientation (upright or inverted) of a character string at high speed and with high accuracy.

Another object of the present invention is to provide a character-recognition pre-processing method which can detect the orientation (upright or inverted) of a character string at high speed and with high accuracy.

Still another object of the present invention is to provide a program recording medium which stores a program used for realization of a character-recognition pre-processing apparatus which can detect the orientation (upright or inverted) of a character string at high speed and with high accuracy.

DISCLOSURE OF THE INVENTION

The present invention provides a character-recognition pre-processing apparatus to detect whether a character string to be subjected to character recognition is in an upright state or in an inverted state. The apparatus comprises extraction means for extracting an image of a character string to be subjected to character recognition; setting means for setting the smallest rectangle that surrounds the character string image extracted by the extraction means; specifying means for specifying the position of each character within the smallest rectangle set by the setting means; detection means for detecting, at each character position specified by the specifying means, the shortest distance between a character region and the lower edge of the smallest rectangle, and the shortest distance between the character region and the upper edge of the smallest rectangle; and judgment means for judging whether the character string extracted by the extraction means is in an upright state or an inverted state, on the basis of variations in the two shortest distances detected by the detection means.

The present invention further provides a character-recognition pre-processing method to detect whether a character string to be subjected to character recognition is in an upright state or in an inverted state. The method comprises a step of extracting an image of a character string to be subjected to character recognition; a step of setting the smallest rectangle that surrounds the character string image extracted in the first processing step; a step of specifying the position of each character within the smallest rectangle set in the second processing step; a fourth step of detecting, at each character position specified in the third processing step, the shortest distance between a character region and the lower edge of the smallest rectangle, and the shortest distance between the character region and the upper edge of the smallest rectangle; and a step of judging whether the character string extracted in the first processing step is in an upright state or an inverted state, on the basis of variations in the two shortest distances detected in the fourth processing step.

The character-recognition pre-processing apparatus and method according to the present invention enable detection of the orientation (upright or inverted) of a character string without performance of character recognition processing. Accordingly, the load imposed on a CPU during the processing for detecting the orientation (upright or inverted) of a character string can be reduced. Further, since character recognition processing is not used, orientation detection can be performed accurately in the case of detection of the orientation of a character such as "H" which assumes the same (or substantially the same) shape even when rotated by 180 degrees, or in the case of detection of the orientation of a character such as "M" or "W" which, when rotated by 180 degrees, assumes a shape very similar to that of a different character. As a result, the character-recognition pre-processing apparatus and method according to the present invention can improve detection accuracy when characters to be subjected to character recognition are English characters or like characters.

Further, since a program recording medium according to the present invention stores a program to realize the above-described character-recognition pre-processing apparatus, the program recording medium can realize the above-described character-recognition pre-processing apparatus.

BEST MODE FOR CARRYING OUT THE INVENTION

Figure 1:
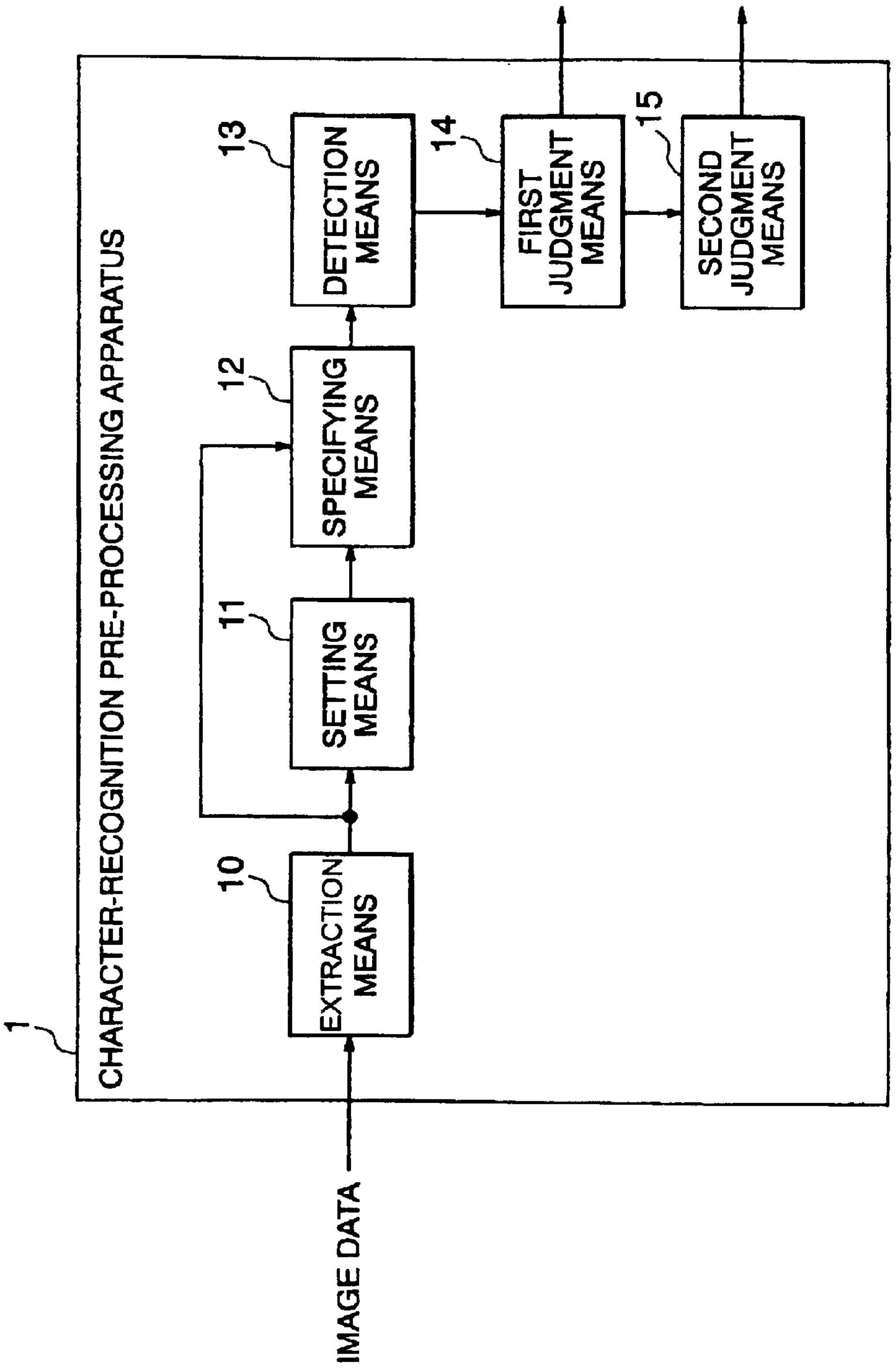
FIG. 1 is a block diagram showing the principle constitution of the present invention.

FIG. 1 shows the principle or constitution of the present invention. A character-recognition pre-processing apparatus 1 according to the present invention shown in FIG. 1 detects the orientation (upright or inverted) of a character string to be subjected to character recognition. The character-recognition pre-processing apparatus 1 includes extraction means 10, setting means 11, specifying means 12, detection means 13, first judgment means 14, and second judgment means 15.

The extraction means 10 extracts an image of a character string to be subjected to character recognition. The setting means 11 sets the smallest rectangle that surrounds the character string image extracted by the extraction means 10. The specifying means 12 specifies the position of each character within the smallest rectangle set by the setting means 11. For each character position specified by the specifying means 12, the detection means 13 detects the shortest distance between the character region and the lower edge of the smallest rectangle set by the setting means 11, and the shortest distance between the character region and the upper edge of the smallest rectangle. The first judgment means 14 judges whether the character string detected by the extraction means 10 is in an upright state or an inverted state, on the basis of variation in the shortest distance from the lower edge of the smallest rectangle detected by the detection means 13 and variation in the shortest distance from the upper edge of the smallest rectangle detected by the detection means 13. When the image to be subjected to character recognition contains a plurality of character strings, the second judgment means 15 makes a judgment as to whether the image is in an upright image or an inverted image, on the basis of information regarding the orientations (upright or inverted) of the character strings judged by the first judgment means 14.

In actuality, the functions of the character-recognition pre-processing apparatus 1 are realized by a program. The program is stored on a floppy disk or a hard disk drive of a server, and is installed in the character-recognition pre-processing apparatus 1 of the present invention, so that the program operates on a CPU of the character-recognition pre-processing apparatus 1. Thus, the present invention is realized.

In the character-recognition pre-processing apparatus 1 having the above-described configuration, when the extraction means 10 extracts an image of a character string to be subjected to character recognition, the setting means 11 sets the smallest rectangle that surrounds the character string image extracted by the extraction means 10.

While using the thus-set smallest rectangle, the specifying means 12 specifies the position of each character within the smallest rectangle, by detecting spaces present between characters. Alternatively, the specifying means 12 estimates a character width from a character height defined by the smallest rectangle and specifies the position of each character within the smallest rectangle by use of the estimated character width.

For each of the thus-specified character positions, the detection means 13 detects the shortest distance between the character region and the lower edge of the smallest rectangle set by the setting means 11, and the shortest distance between the character region and the upper edge of the smallest rectangle.

While using the detection results, the first judgment means 14 judges whether the character string is in an upright state or an inverted state, on the basis of variation in the shortest distance from the lower edge of the smallest rectangle and variation in the shortest distance from the upper edge of the smallest rectangle. For example, the side of a character string which produces a larger variation is judged to correspond to the top of the character string. The first judgment means 14 performs the above judgment in consideration of the fact that in some cases the orientation of a character string cannot be determined, due to the attributes of characters contained in the character string.

When the image to be subjected to character recognition contains a plurality of character strings, the second judgment means 15 makes a judgment as to whether the image is in an upright image or an inverted image, on the basis of the result of the judgment which is made by the first judgment means 14 as to whether each of the character strings is in an upright state or an inverted state.

As described above, the character-recognition pre-processing apparatus 1 of the present invention employs a configuration such that when a string of characters, such as English characters, which produces a difference between variation in the envelope formed on the upper side of the character string and variation in the envelope formed on the lower side of the character string is subjected to character recognition, the orientation (upright or inverted) of the character string is detected through detection of the two variations, without use of character recognition. Thus, the orientation (upright or inverted) of a character string can be detected while minimizing the load imposed on a CPU.

The character-recognition pre-processing apparatus 1 can accurately detect the orientation (upright or inverted) of a character string to be subjected to character recognition, even when the character string is a string of characters, such as English characters, which include characters which, when rotated by 180 degrees assume shapes very similar to those of other characters.

A mode of the present invention will now be described in detail.

Figure 2:
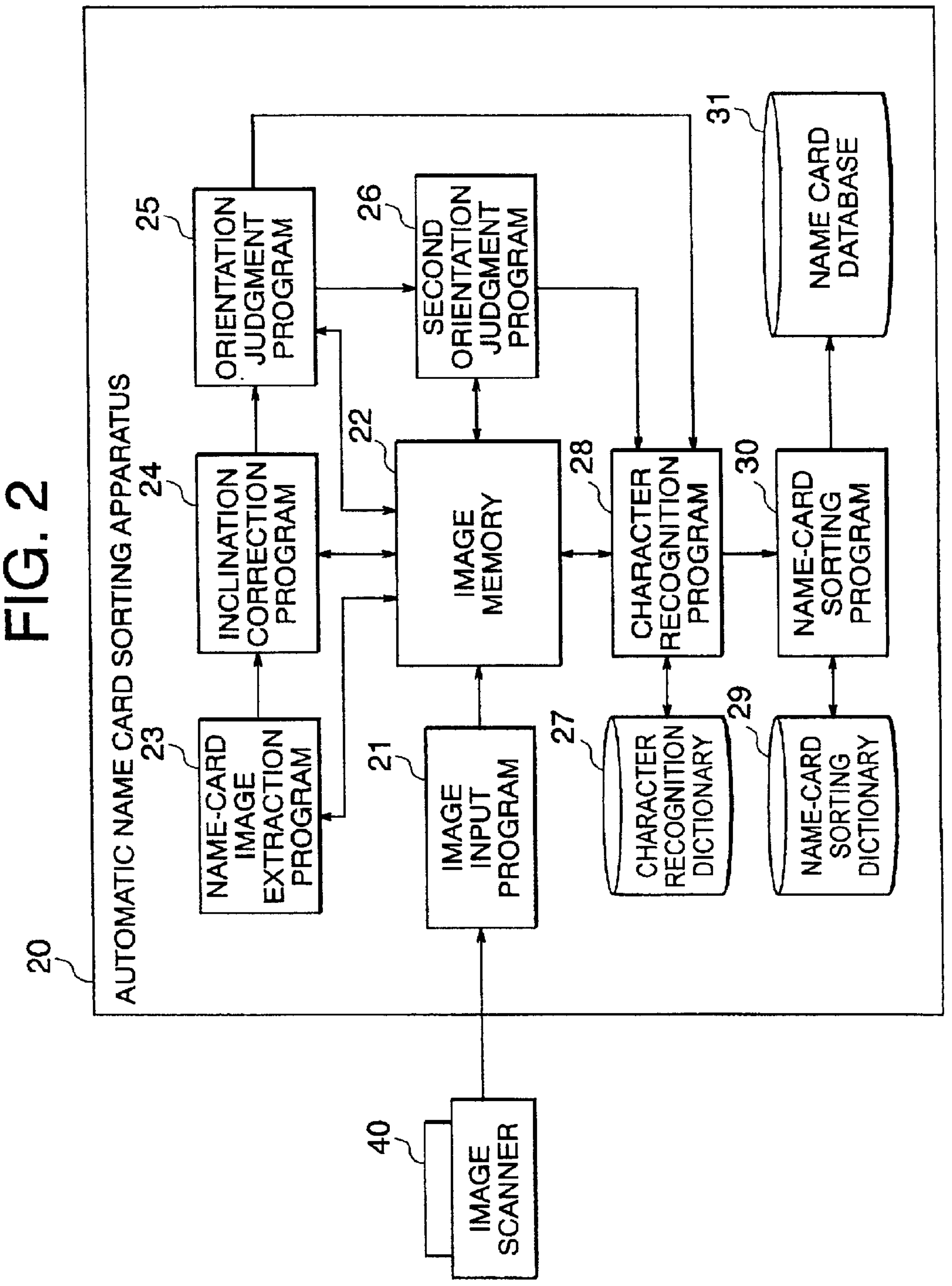
FIG. 2 shows an embodiment of the present invention.
Figure 3:
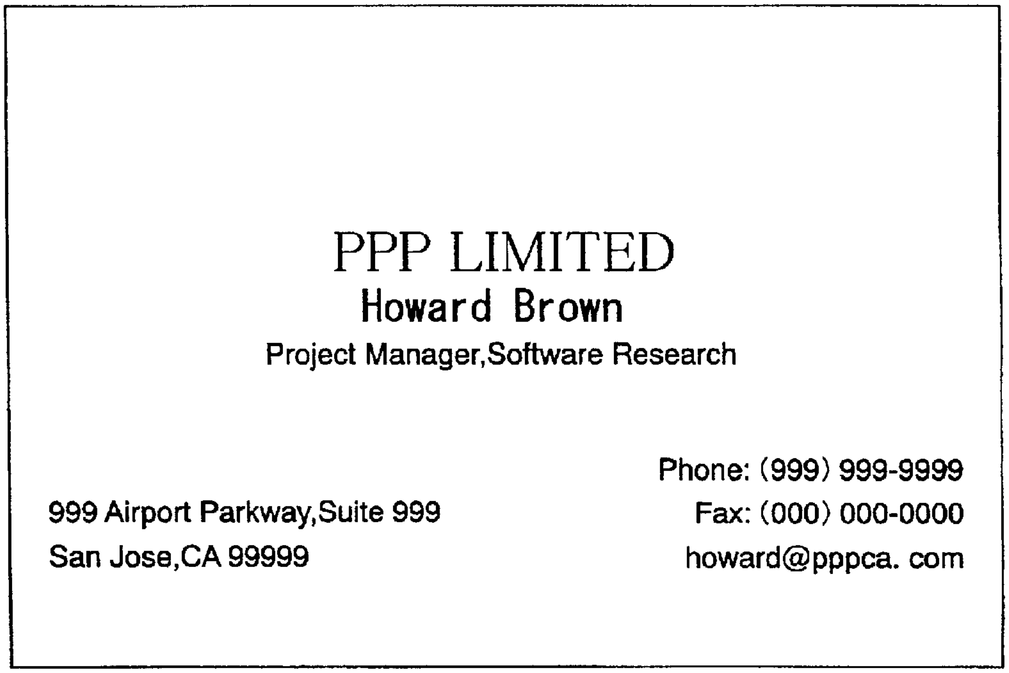
FIG. 3 is an explanatory illustration showing a name card.
Figure 4:
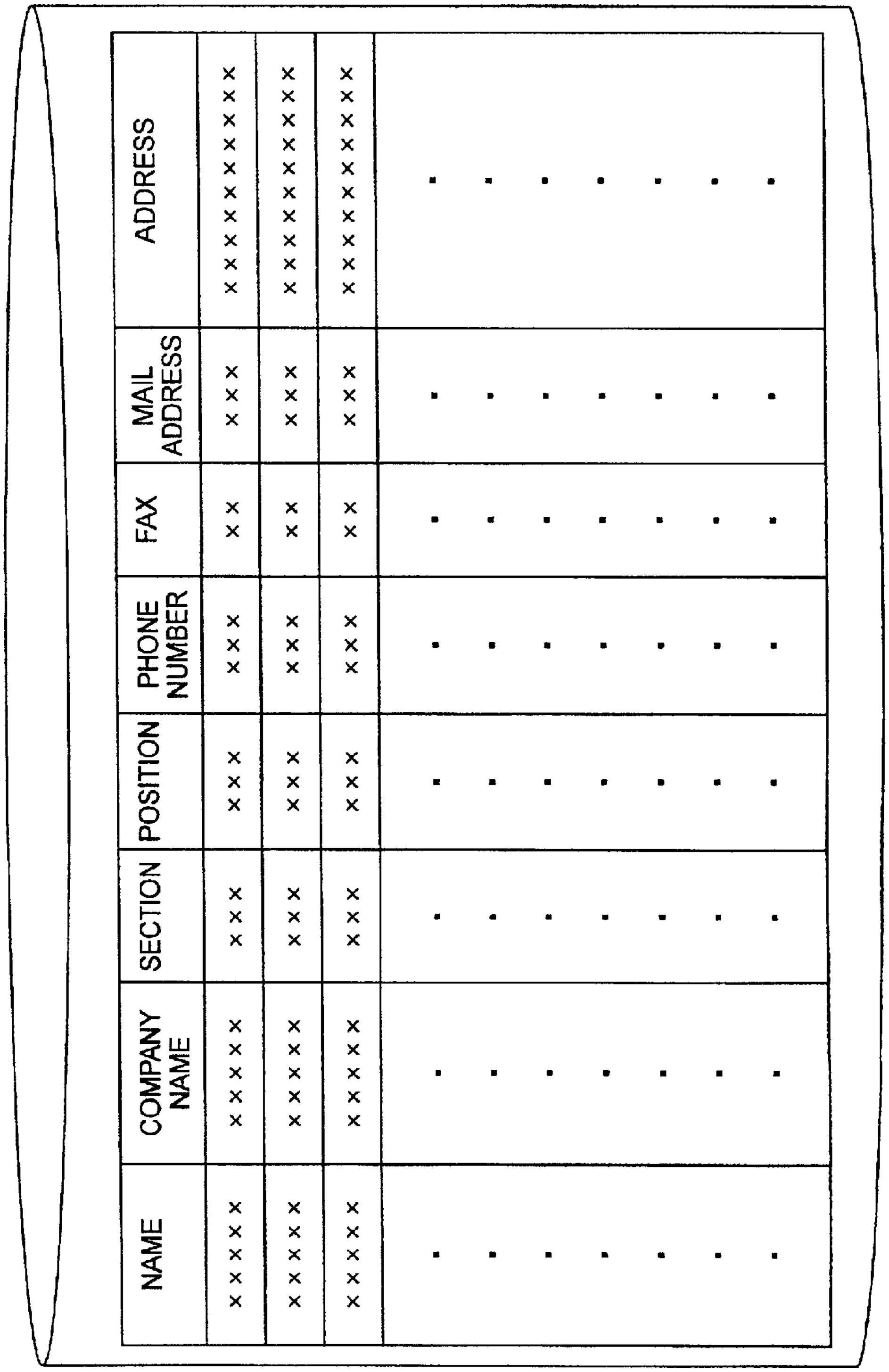
FIG. 4 is an explanatory diagram showing a name-card database.

FIG. 2 shows an embodiment of an automatic name-card sorting apparatus 20 to which the present invention is applied. The automatic name-card sorting apparatus 20 recognizes characters printed on an English name card as shown in FIG. 3 and read out by an image scanner 40. While using the results of recognition, the automatic name-card sorting apparatus 20 produces a name-card database as shown in FIG. 4 to thereby automatically sort name cards.

In order to realize the above-described processing, the automatic name-card sorting apparatus 20 includes an image input program 21, image memory 22, a name-card image extraction program 23, an inclination correction program 24, an orientation judgment program 25, a second orientation judgment program 26, a character recognition dictionary 27, a character recognition program 28, a name-card sorting dictionary 29, a name-card sorting program 30, and a name-card database 31.

The image input program 21 receives an image read by the image scanner 40. The image memory 22 stores the image received by the image input program 21.

Figure 5:
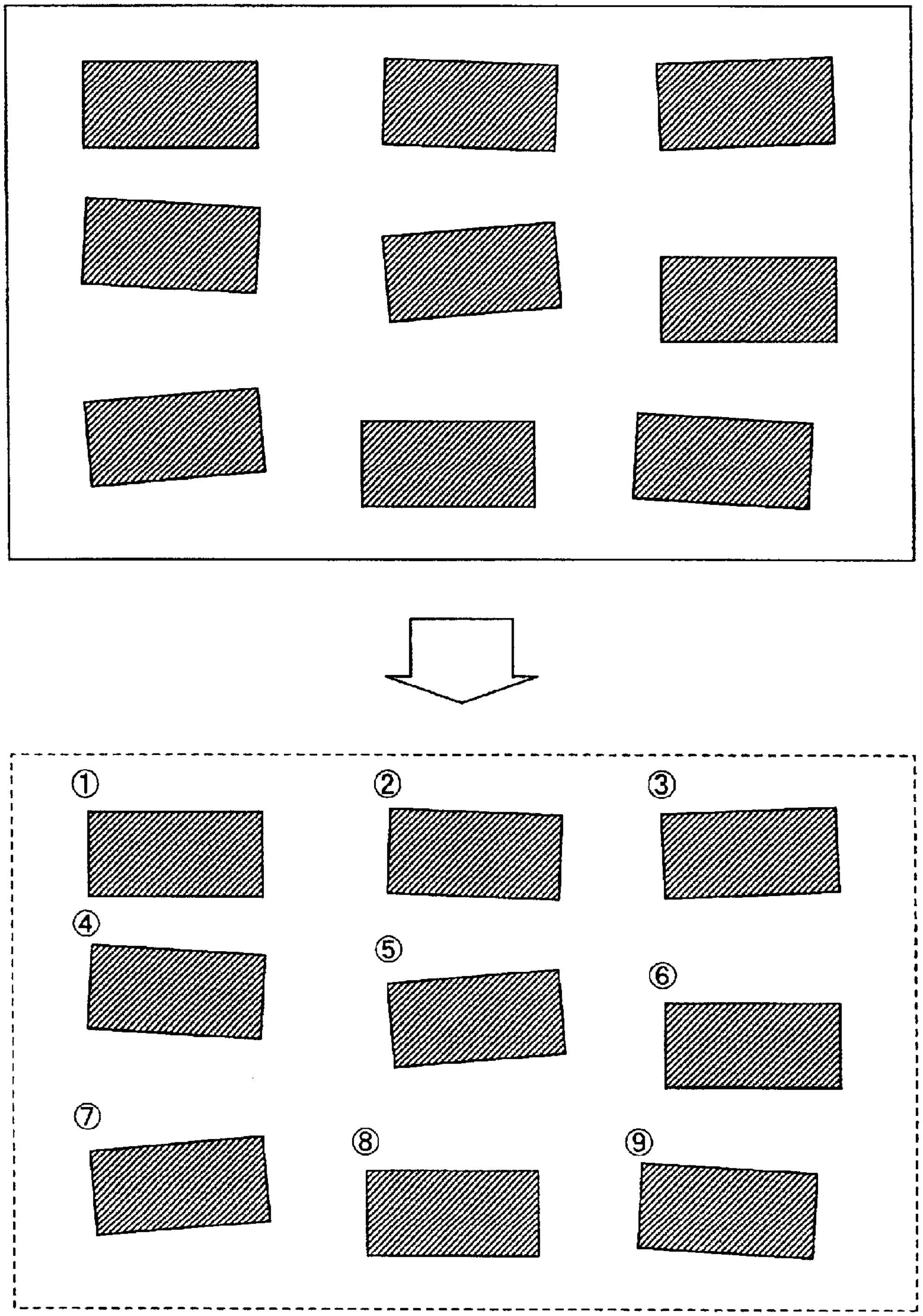
FIG. 5 is an explanatory diagram showing processing of a name-card image extraction program.

The name-card image extraction program 23 is designed in consideration of cases where a plurality of name cards are placed on the image scanner 40. In such a case, as shown in FIG. 5, the name-card image extraction program 23 separates images of the name cards from background to thereby extract the name card images (indicated by ① to ⑨ in FIG. 5) from the image read by the scanner 40.

Figure 6:
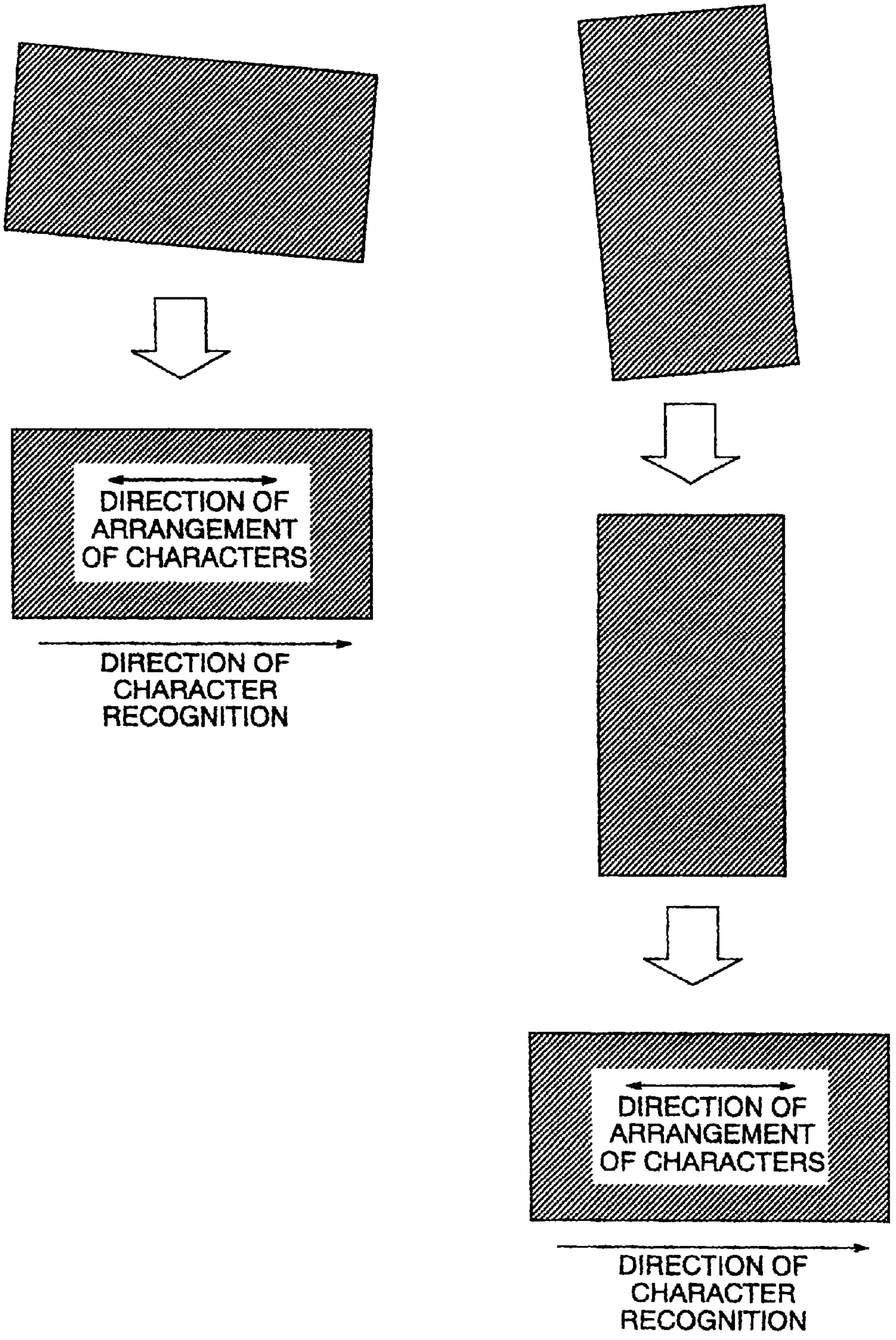
FIG. 6 is an explanatory diagram showing processing of an inclination correction program.

For each of the name card images extracted by the name-card image extraction program 23, the inclination correction program 24 performs processing for rotating the name card image such that, as shown in FIG. 6, the direction of arrangement of characters contained in each character string printed on a name card coincides with the direction of character recognition.

The orientation judgment program 25 extracts images of character strings from each name-card image having been subjected to orientation correction performed by the inclination correction program 24. Subsequently, the orientation judgment program 25 detects the orientation of each character string. Thus, the orientation judgment program 25 judges whether each name-card image is in an upright state or an inverted state. When the name-card image is judged to be in the inverted state, the orientation judgment program 25 rotates the name-card image by 180 degrees.

The second orientation judgment program 26 is started when the orientation judgment program 25 fails to judge whether a name-card image is in an upright state or in an inverted state. The second orientation judgment program 26 judges whether each name-card image is in an upright state or in an inverted state, by use of a character recognition technique. When the name-card image is judged to be in the inverted state, the second orientation judgment program 26 rotates the name-card image by 180 degrees.

The character recognition dictionary 27 manages a list of printed items, such as name, company name, department, position, and address, which are possibly printed on name cards.

While using each name-card image which has been corrected to assume an upright orientation by the orientation judgment program 25 or the second orientation judgment program 26, the character recognition program 28 recognize characters printed on the corresponding name card, with reference to dictionary data of the character recognition dictionary 27.

The name-card sorting dictionary 29 manages keywords regarding the printed items such as such as name, company name, department, position, and address, as well as attribute information (e.g., print position) used in printing of each item on the corresponding name card. The management is performed individually for each of the data items.

With reference to dictionary data of the name-card sorting dictionary 29, the name-card sorting program 30 determines a data item (e.g., name or company) to which each character string recognized by the character recognition program 28 belongs.

The name card database 31 manages information of name cards recognized by the character recognition program 28, which is registered by the name-card sorting program 30 and has a data structure as shown in FIG. 4.

The image input program 21, the name-card image extraction program 23, the inclination correction program 24, the orientation judgment program 25, the second orientation judgment program 26, the character recognition program 28, and the name-card sorting program 30 are installed in the automatic name-card sorting apparatus 20 from a floppy disk or via a communication line, and are operated on the CPU thereof.

Figure 7:
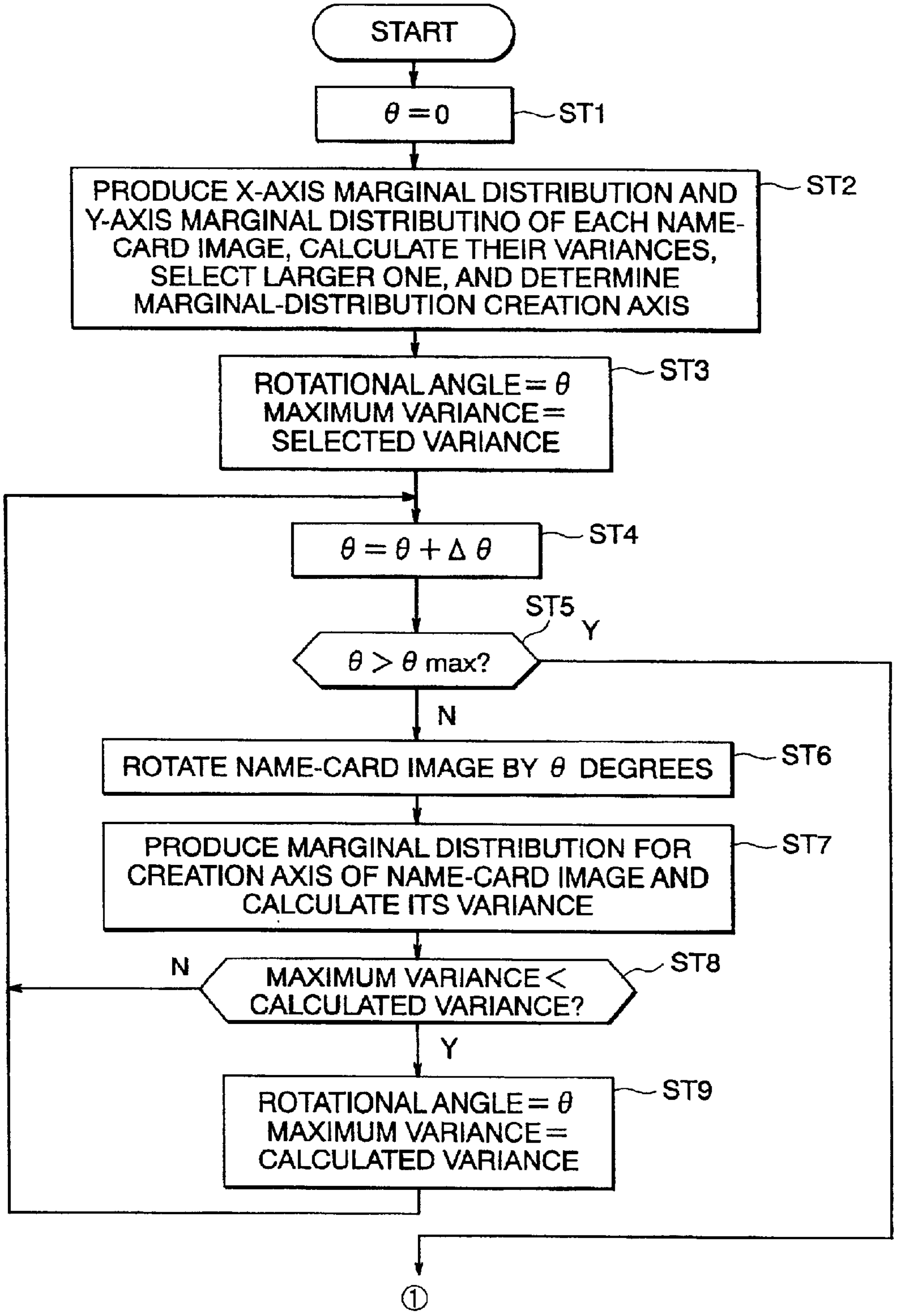
FIGS. 7 and 8 show the processing flow of the inclination correction program.
Figure 8:
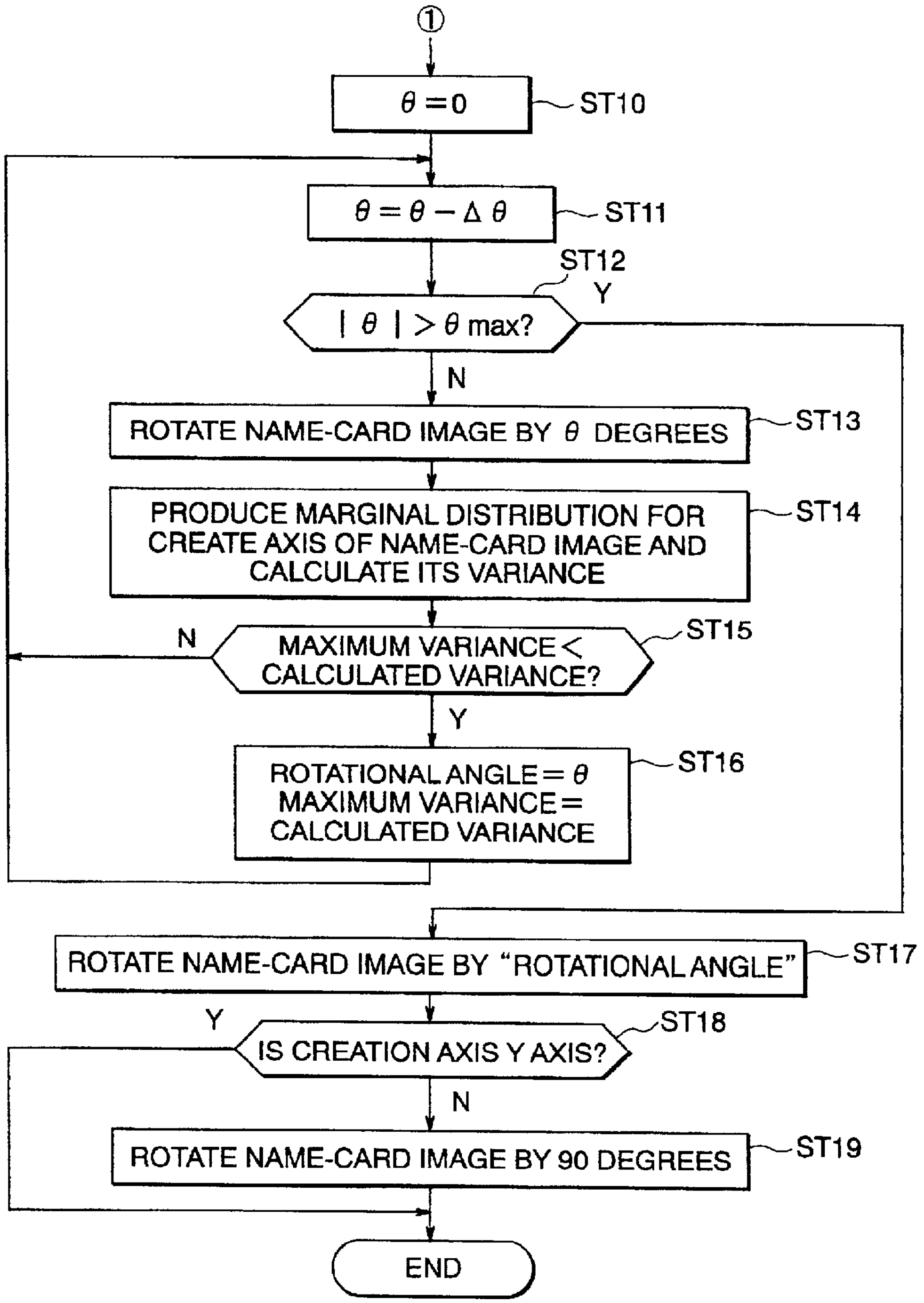
Figure 9:
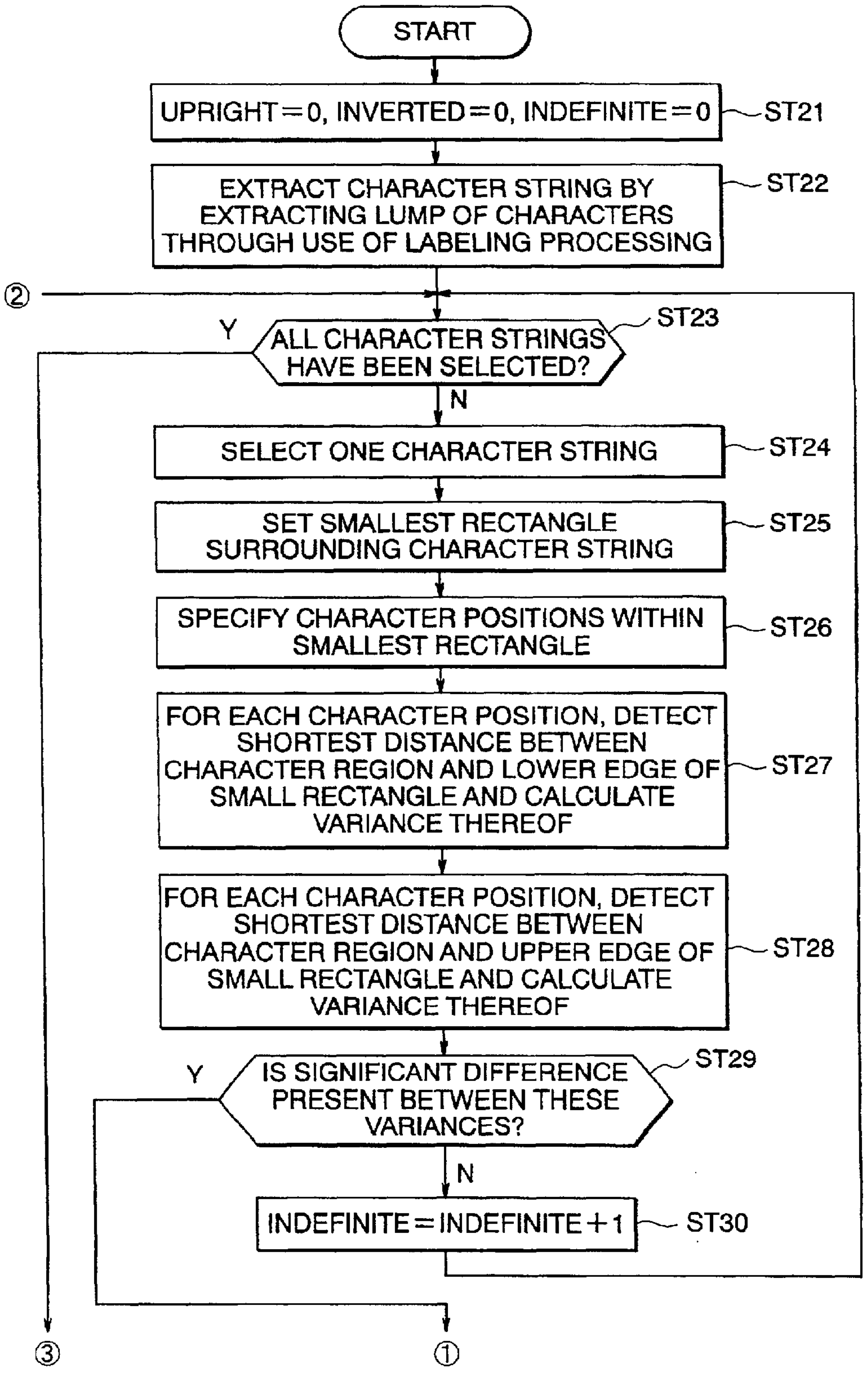
FIGS. 9 and 10 show the processing flow of an orientation judgment program.
Figure 10:
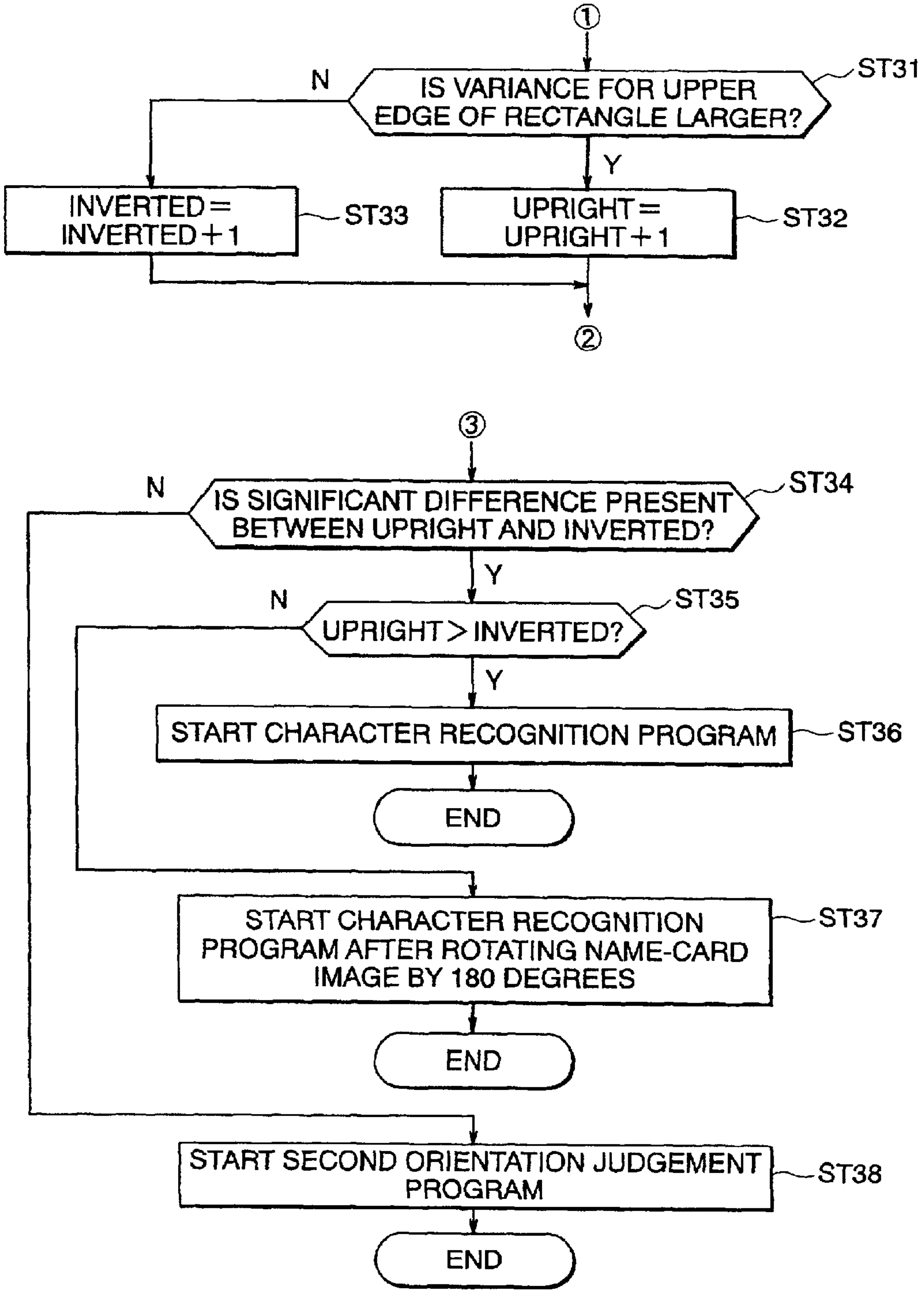

FIGS. 7 and 8 show an embodiment of the processing flow of the inclination correction program 24. FIGS. 9 and 10 show an embodiment of the processing flow of the orientation judgment program 25. Next, the processing performed by the automatic name-card sorting apparatus 20 having the above-described configuration will be described with reference to these processing flows.

The inclination correction program 24 is started after completion of the processing of the name-card image extraction program 23. Upon being started, the inclination correction program 24 performs the processing of FIGS. 7 and 8 for each of the name-card images extracted by the name-card image extraction program 23. Thus, the inclination correction program 24 performs processing for rotating each name-card image in such a manner that the direction of arrangement of character contained in each character string printed on the corresponding name card coincides with the recognition direction along which the characters are recognized (for convenience, the recognition direction will be referred to as the "X-axis direction", and a direction perpendicular thereto will be referred to as the "Y-axis direction").

After having selected one of the name-card images extracted by the name-card image extraction program 23, as shown in the processing flow of FIGS. 7 and 8, the inclination correction program 24 first sets the value of variable θ to 0 (degrees) in step S1.

In subsequent step S2, the inclination correction program 24 produces an X-axis marginal distribution (a histogram distribution of pixel numbers projected onto the X axis) and a Y-axis marginal distribution (a histogram distribution of pixel numbers projected onto the Y axis) of a selected name-card image; calculates their variances and selects a larger variance (the greater the variation of the marginal distribution, the greater the variance); and the axis whose marginal distribution has a larger variance is selected as a creation axis.

Figure 11:
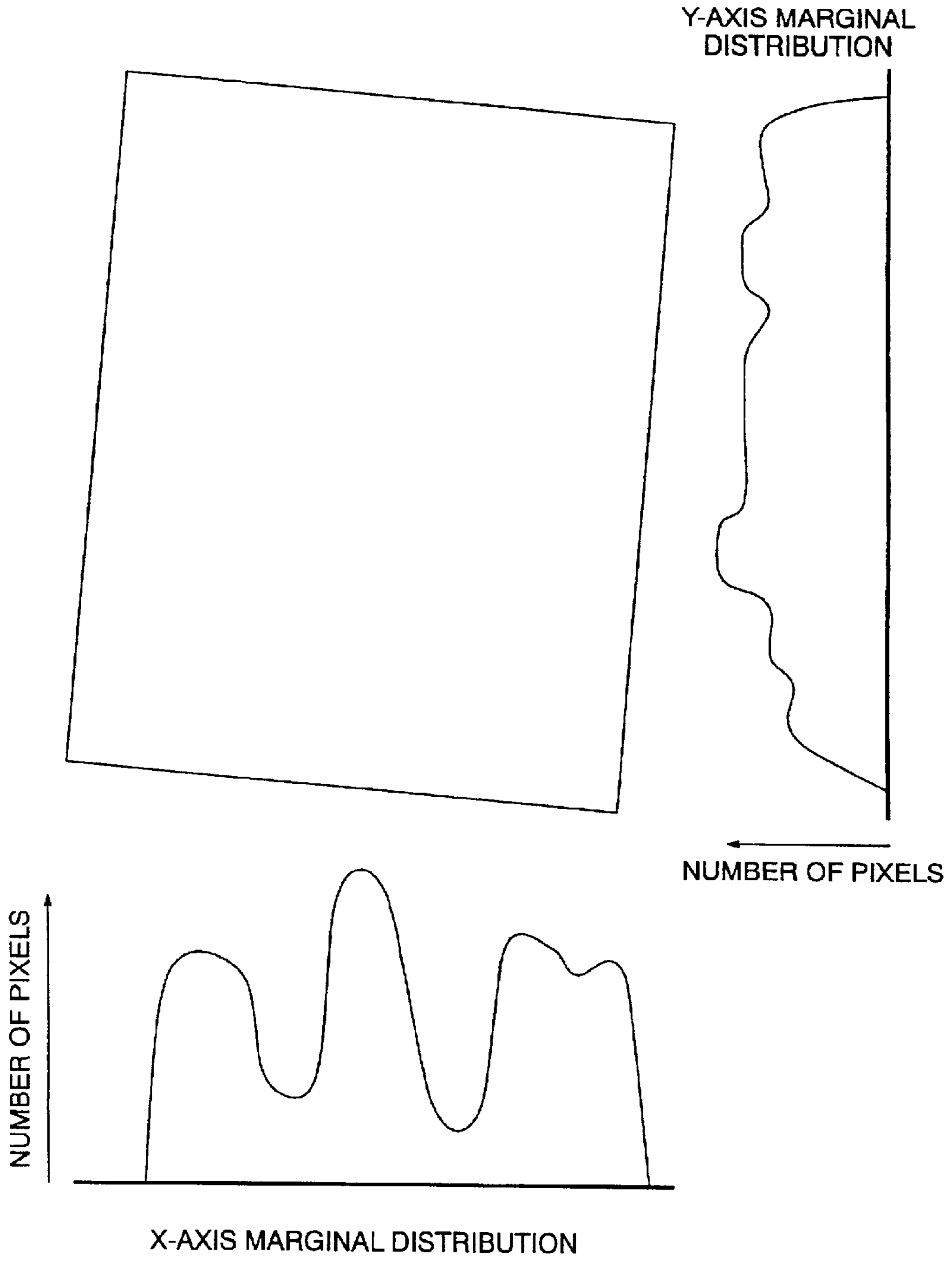
FIGS. 11 and 12 are explanatory diagrams showing the processing of the inclination correction program.

Specifically, as shown in FIG. 11, the inclination correction program 24 produces an X-axis marginal distribution and a Y-axis marginal distribution of the selected name-card image; calculates their variances and selects the larger variance; and selects as a creation axis the axis whose marginal distribution has a larger variance. In the illustrated example, the X axis is selected as a marginal-distribution creation axis.

In a subsequent step S3, the inclination correction program 24 substitutes "θ" for variable "Rotational Angle" and substitutes the variance selected in step S2 for variable "Maximum Variance." In step S4, the inclination correction program 24 increases the value of variable θ by Δθ (Δθ>0); and in subsequent step S5, judges whether the value of variable θ has exceeded a predetermined maximum value θmax (e.g., 10 degrees).

When having judged in the judgment processing that the value of variable θ has not yet exceeded the maximum value θmax, the inclination correction program 24 proceeds to step S6 in order to rotate the selected name-card image by θ degrees (θ>0). In subsequent step S7, the inclination correction program 24 produces a marginal distribution for the creation axis (an X-axis marginal distribution in the case where the X axis serves as a creation axis, or a Y-axis marginal distribution in the case where the Y axis serves as a creation axis) of the rotated name-card image; and calculates the variance thereof.

In subsequent step S8, the inclination correction program 24 judges whether the variance calculated in step S7 is greater than the value of variable "Maximum Variance." When having judged that the calculated variance is not greater than the value of "Maximum Variance," the inclination correction program 24 returns to step S4. When having judged that the calculated variance is greater than the value of "Maximum Variance," the inclination correction program 24 proceeds to step S9. In step S9, the inclination correction program 24 substitutes the value of variable θ for variable "Rotational Angle," and substitutes the variance calculated in step S7 for variable "Maximum Variance." Subsequently, the inclination correction program 24 returns to step S4.

When, during repeated execution of the processing in steps S4 to S9, the inclination correction program 24 judges in step S5 that the value of variable θ has exceeded the maximum value θmax, the inclination correction program 24 proceeds to step S10 (the processing flow of FIG. 8). In step S10, the inclination correction program 24 resets the value of variable θ to 0 degrees, which is the initial rotational angle.

In subsequent step S11, the inclination correction program 24 decreases the value of variable θ by Δθ (Δθ>0); and in subsequent step S12, judges whether the absolute value of variable θ has exceeded a predetermined maximum value θmax.

When having judged in the judgment processing in step S12 that the absolute value of variable θ has not yet exceeded the maximum value θmax, the inclination correction program 24 proceeds to step S13 in order to rotate the selected name-card image by θ degrees (θ<0). In step S14, the inclination correction program 24 produces a marginal distribution for the creation axis of the rotated name-card image; and calculates the variance thereof.

In subsequent step S15, the inclination correction program 24 judges whether the variance calculated in step S14 is greater than the value of variable "Maximum Variance." When having judged that the calculated variance is not greater than the value of "Maximum Variance," the inclination correction program 24 returns to step S11. When having judged that the calculated variance is greater than the value of "Maximum Variance," the inclination correction program 24 proceeds to step S16. In step S16, the inclination correction program 24 substitutes the value of variable θ for variable "Rotational Angle," and substitutes the variance calculated in step S14 for variable "Maximum Variance." Subsequently, the inclination correction program 24 returns to step S11.

When, during repeated execution of the processing in steps S11 to S16, the inclination correction program 24 judges in step S12 that the absolute value of variable θ has exceeded the maximum value θmax, the inclination correction program 24 proceeds to step S17. In step S17, the inclination correction program 24 rotates the selected name-card image by the angle of variable "Rotational Angle."

That is, the inclination correction program 24 rotates the selected name-card image by such an amount that the variance of the marginal distribution of the selected name-card image is maximized. Through this operation, the inclination correction program 24 rotates the selected name-card image in such a manner that the direction of arrangement of characters contained in each character string printed on the corresponding name card coincides with the character recognition direction. Alternatively, as shown in FIG. 12, the inclination correction program 24 rotates the selected name-card image in such a manner that the direction of arrangement of characters contained in each character string printed on the corresponding name card coincides with a direction perpendicular to the character recognition direction.

When there is employed a configuration which enables the rotated image exhibiting the maximum variance (the rotated image calculated in step S6 or S13) to be stored, the rotating processing in step S17 becomes unnecessary.

In subsequent step S18, the inclination correction program 24 judges whether the marginal-distribution creation axis is the Y axis. When having judged that the marginal-distribution creation axis is the Y axis, the inclination correction program 24 ends the processing without performing further processing. When having judged that the creation axis is not the Y axis but the X axis, the inclination correction program 24 proceeds to step S19. In step S19, the inclination correction program 24 rotates the selected image by 90 degrees and then ends the processing.

Figure 12:
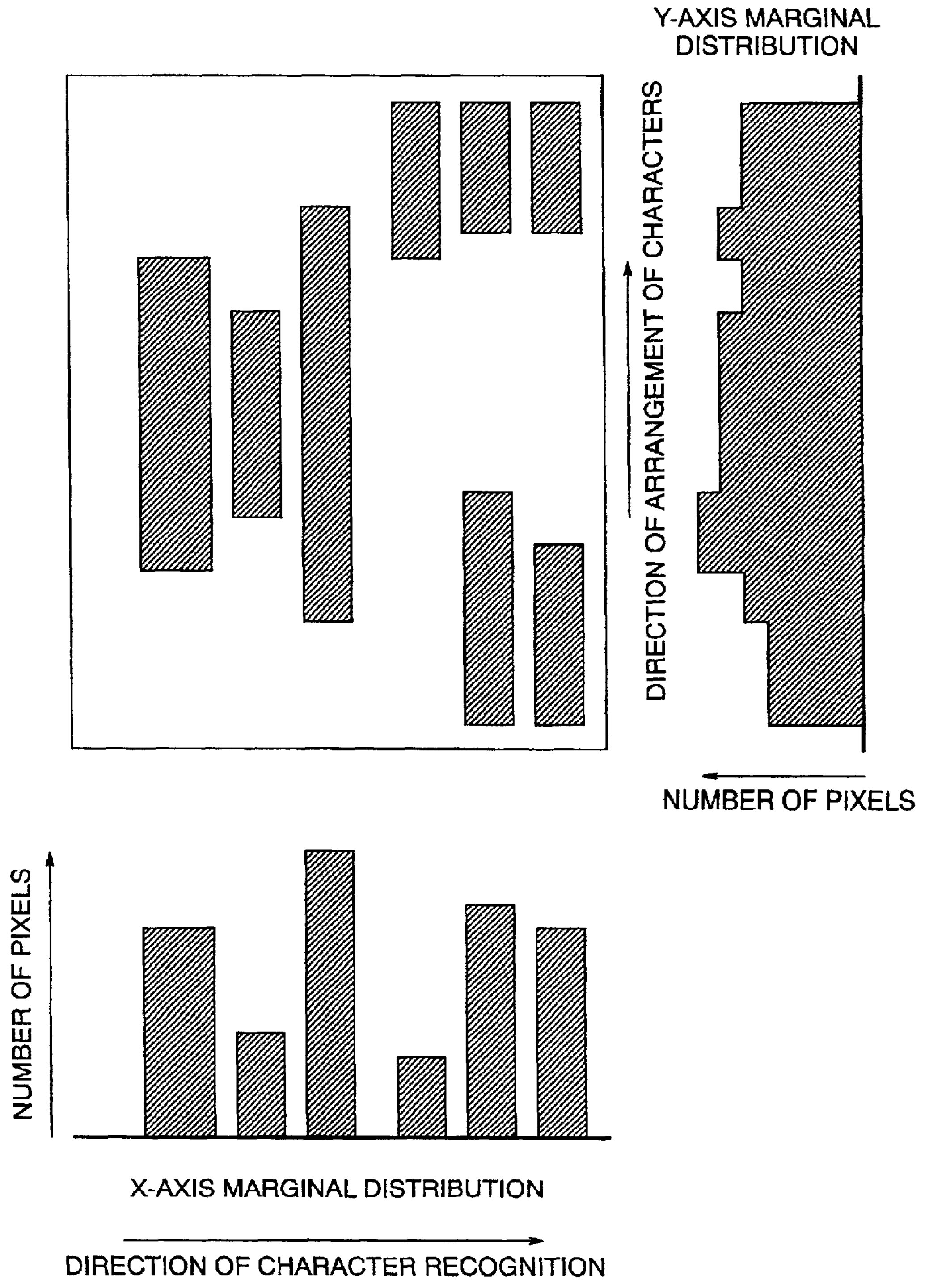

That is, as shown in FIG. 12, since the variation of the X-axis marginal distribution is greater than that of the Y-axis marginal distribution, the variance of the X-axis marginal distribution becomes greater than that of the Y-axis marginal distribution. When the X axis is selected to serve as the marginal-distribution creation axis, the direction of arrangement of characters contained in each character string printed on the corresponding name card coincides with a direction perpendicular to the character recognition direction. Accordingly, the inclination correction program 24 rotates the selected name-card image by 90 degrees, so that the direction of arrangement of characters contained in each character string printed on the corresponding name card coincides with the character recognition direction.

Through the above-described operation, the inclination correction program 24 rotates each of the name-card images extracted by the name-card image extraction program 23 in such a manner that the direction of arrangement of characters contained in each character string printed on the corresponding name card coincides with the character recognition direction, as shown in FIG. 6.

Next, the processing performed by the orientation judgment program 25 will be described.

Figure 13A:
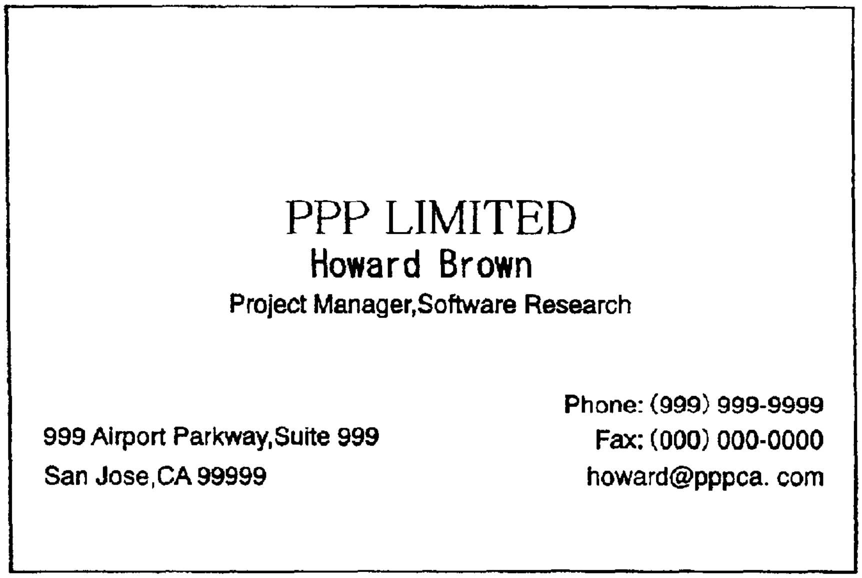
FIGS. 13*a* and 13*b* are an explanatory diagram showing name-card images.
Figure 13B:
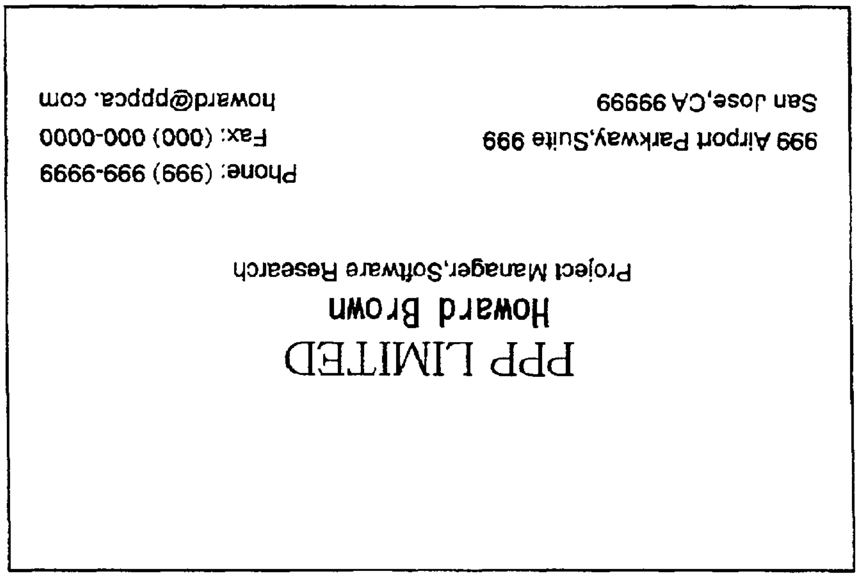

As shown in FIGS. 13*a* and 13*b*, each name-card image obtained by the inclination correction program 24 may be in either an upright state or an inverted state (rotated by 180 degrees). In view of this, upon being started after completion of the processing of the inclination correction program 24, the orientation judgment program 25 judges whether a name-card image obtained by the inclination correction program 24 is in an upright state or an inverted state, in accordance with the process flow of FIGS. 9 and 10. When the name-card image is judged to be inverted, the orientation judgment program 25 rotates the image by 180 degrees, so that the name-card image is in an upright state.

Specifically, in first step S21, the orientation judgment program 25 substitutes "0" for each of variables "Upright," "Inverted," and "Indefinite."

In subsequent step S22, the orientation judgment program 25 extracts character strings from a selected name-card image to be processed (a different name-card image is sequentially selected from the name-card images obtained by the inclination correction program 24). Specifically, by use of labeling processing, which is commonly used in image processing, the orientation judgment program 25 allots the same label to black pixels connected to one another (character portions) to thereby extract the character portions, and judges character portions which are not separated from one another by a predetermined distance to belong to the same character string and merges them, whereby character strings contained in the selected name-card image are extracted.

Figure 14:
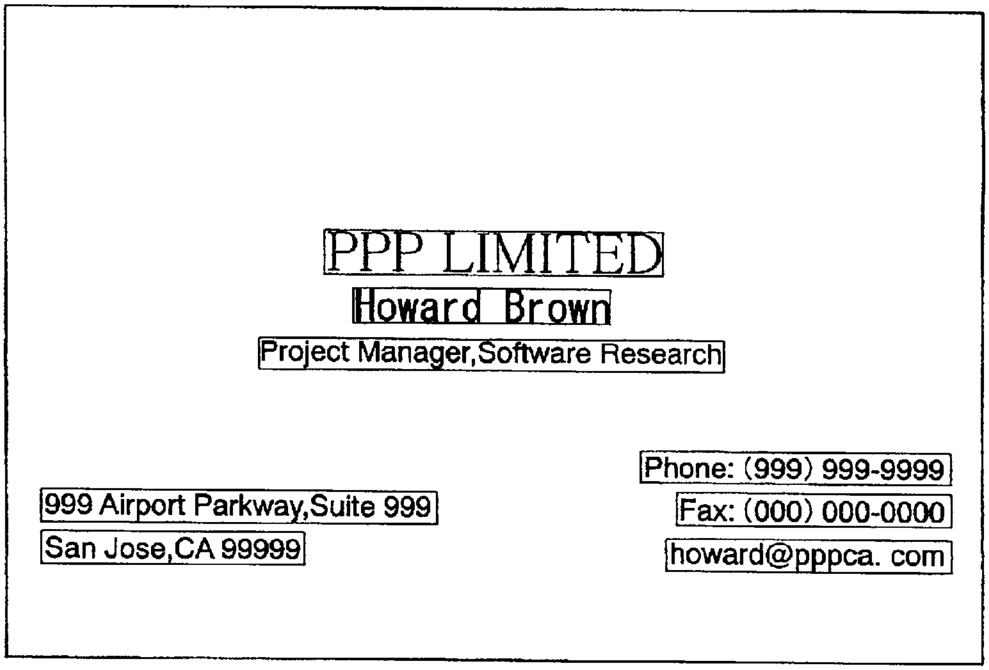
FIG. 14 is an explanatory diagram showing extraction of a character string.

Specifically, in the case of a name-card image shown in FIG. 14, the orientation judgment program 25 extracts eight character strings, each of which is surrounded by a rectangle (smallest rectangle, which will be described later).

In subsequent step S23, the orientation judgment program 25 judges whether all the character strings extracted in step S22 have been selected. When having judged that not all the character strings have been selected, the orientation judgment program 25 proceeds to step S24 and selects an unselected character string from the character strings extracted in step S22. In subsequent step S25, the orientation judgment program 25 sets smallest rectangles that surround the selected character strings, respectively, as shown in FIG. 14.

Figure 15A:
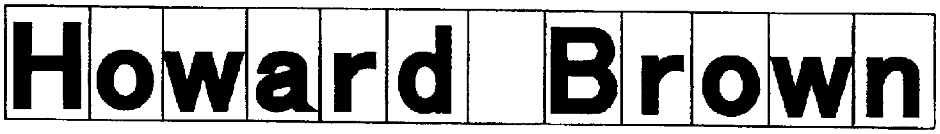
FIGS. 15*a* and 15*b* and FIGS. 16*a* to 16*d* are explanatory diagrams showing the processing of the orientation judgment program.

In subsequent step S26, the orientation judgment program 25 specifies the positions of the characters within the smallest rectangles. In the case of an example shown in FIG. 15*a*, the positions of characters "H," "o," "w," "a," "r," "d," "B," "r," "o," "w," and "n" are specified.

The above-described processing for specifying character positions are performed, making use of spaces present between characters. However, in some cases, no space is present between characters. In such a case, the orientation judgment program 25 regards the height of the smallest rectangle (the length in the direction perpendicular to the direction of arrangement of characters) as the height of characters, and estimates the width of each character on the basis of the estimated character width. Subsequently, the orientation judgment program 25 splits the character string into characters by use of the estimated width. Thus, the positions of the individual characters are specified or determined.

In subsequent step S27, the orientation judgment program 25 defines a plurality of (e.g., five) sampling lines at equal intervals at each of the character positions specified in step S26; detects the distance between the character region and the lower edge of the smallest rectangle as measured along each sampling line; and selects the shortest distance among the distances measured along the five sampling lines. In this manner, for each of the character positions specified in step S26, the orientation judgment program 25 calculates the shortest distance between the character region and the lower edge of the smallest rectangle. Further, the orientation judgment program 25 calculates a variance of the shortest distances.

Figure 15B:
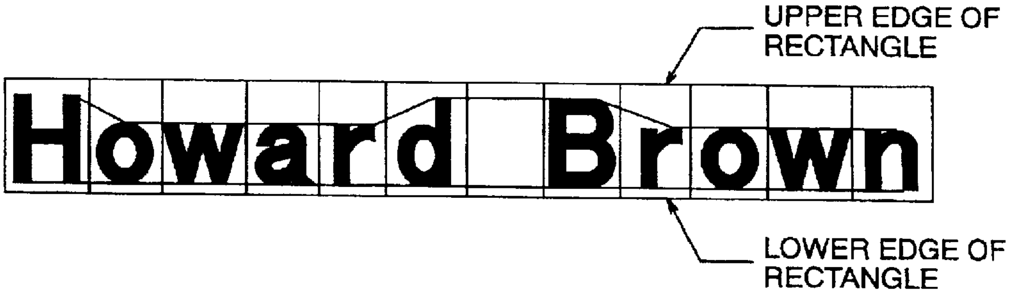

Specifically, in the case of an example shown in FIG. 15*b*, the orientation judgment program 25 calculates the shortest distance $X_H$ between the character region of "H" and the lower edge of the smallest rectangle, the shortest distance $X_o$ between the character region of "o" and the lower edge of the smallest rectangle, the shortest distance $X_w$ between the character region of "w" and the lower edge of the smallest rectangle, the shortest distance $X_a$ between the character region of "a" and the lower edge of the smallest rectangle, the shortest distance $X_r$ between the character region of "r" and the lower edge of the smallest rectangle, the shortest distance $X_d$ between the character region of "d" and the lower edge of the smallest rectangle, the shortest distance $X_B$ between the character region of "B" and the lower edge of the smallest rectangle, the shortest distance $X_r$ between the character region of "r" and the lower edge of the smallest rectangle, the shortest distance $X_o$ between the character region of "o" and the lower edge of the smallest rectangle, the shortest distance $X_w$ between the character region of "w" and the lower edge of the smallest rectangle, and the shortest distance $X_n$ between the character region of "n" and the lower edge of the smallest rectangle. Subsequently, the orientation judgment program 25 calculates a variance of these shortest distances.

The thus-calculated variance assumes a small value when the shortest distances involve a small variation, and assumes a large value when the shortest distances involve a large variation.

In subsequent step S28, for each of the character positions specified in step S26, the orientation judgment program 25 calculates the distance between the character region and the upper edge of the smallest rectangle as measured along each sampling line set in step S27, and selects the shortest distance among them. In this manner, for each of the character positions specified in step S26, the orientation judgment program 25 calculates the shortest distance between the character region and the upper edge of the smallest rectangle. Further, the orientation judgment program 25 calculates a variance of the shortest distances.

Specifically, in the case of an example shown in FIG. 15*b*, the orientation judgment program 25 calculates the shortest distance $X_H$ between the character region of "H" and the upper edge of the smallest rectangle, the shortest distance $X_o$ between the character region of "o" and the upper edge of the smallest rectangle, the shortest distance $X_w$ between the character region of "w" and the upper edge of the smallest rectangle, the shortest distance $X_a$ between the character region of "a" and the upper edge of the smallest rectangle, the shortest distance $X_r$ between the character region of "r" and the upper edge of the smallest rectangle, the shortest distance $X_d$ between the character region of "d" and the upper edge of the smallest rectangle, the shortest distance $X_B$ between the character region of "B" and the upper edge of the smallest rectangle, the shortest distance $X_r$ between the character region of "r" and the upper edge of the smallest rectangle, the shortest distance $X_o$ between the character region of "o" and the upper edge of the smallest rectangle, the shortest distance $X_w$ between the character region of "w" and the upper edge of the smallest rectangle, and the shortest distance $X_n$ between the character region of "n" and the upper edge of the smallest rectangle. Subsequently, the orientation judgment program 25 calculates a variance of these shortest distances.

The thus-calculated variance assumes a small value when the shortest distances involve a small variation, and assumes a large value when the shortest distances involve a large variation.

In subsequent step S29, the orientation judgment program 25 judges whether a significant difference is present between the variance calculated in step S27 and the variance calculated in step S28. When having judged that no significant difference is present between the variances, the orientation judgment program 25 proceeds to step S30. After incrementing the value of variable "Indefinite" by one in step S30, the orientation judgment program 25 returns to step S23 in order to process the next character string.

Figure 16A:
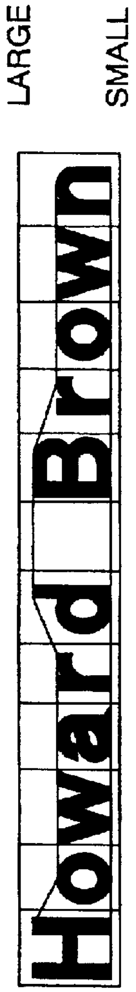
Figure 16B:
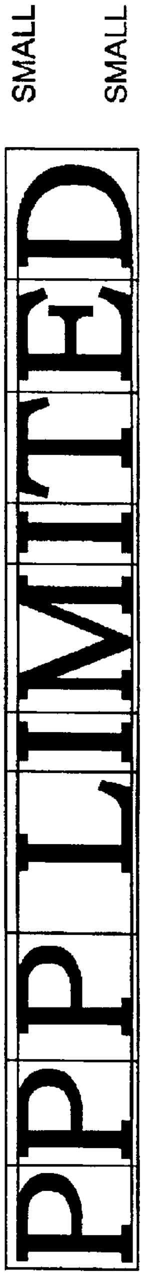

That is, in the case where English characters which constitute a character string are all capital letters, as shown in FIG. 16*b*, the variance calculated in step S27 (the variance of the shortest distances between the respective character regions and the lower edge of the smallest rectangle) becomes substantially equal to the variance calculated in step S28 (the variance of the shortest distances between the respective character regions and the upper edge of the smallest rectangle). In such a case, the value of variable "Indefinite" is incremented by one.

When having judged that a significant difference is present between the variance calculated in step S27 and the variance calculated in step S28, the orientation judgment program 25 proceeds to step S31 (the processing flow of FIG. 10). In step S31, the orientation judgment program 25 judges whether the variance calculated in step S28 is greater than the variance calculated in step S27. When having judged that the variance calculated in step S28 is greater than the variance calculated in step S27, the orientation judgment program 25 proceeds to step S32 in order to increment the value of variable "Upright" by one. Subsequently, the orientation judgment program 25 returns to step S23 in order to process the next character string.

Figure 16C:
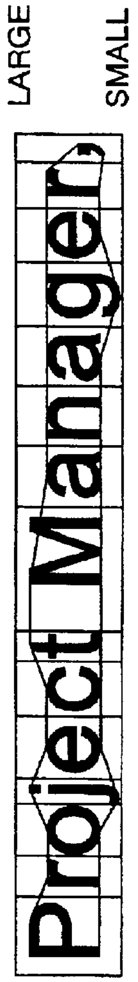
Figure 16D:
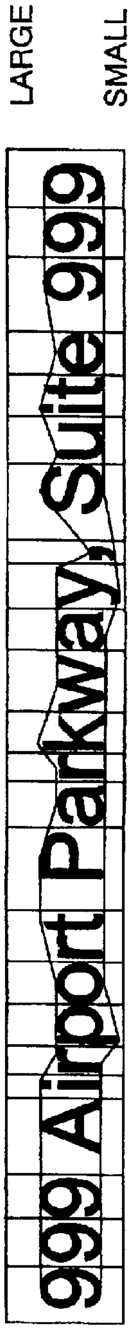

That is, in the case where some of English characters which constitute a character string are lowercase letters, and the character string is in an upright state, the lower edge of the smallest rectangle serves as the base line of the characters. In such a case, as shown in FIGS. 16*a*, 16*c*, and 16*d*, the variance calculated in step S28 (the variance of the shortest distances between the respective character regions and the upper edge of the smallest rectangle) becomes greater than the variance calculated in step S27 (the variance of the shortest distances between the respective character regions and the lower edge of the smallest rectangle). Therefore, in such a case, the value of variable "Upright" is incremented by one.

When having judged in step S31 that the variance calculated in step S28 is smaller than the variance calculated in step S27, the orientation judgment program 25 proceeds to step S33 in order to increment the value of variable "Inverted" by one. Subsequently, the orientation judgment program 25 returns to step S23 in order to process the next character string.

That is, in the case where a character string is in an inverted state (rotated 180 degrees), the upper edge of the smallest rectangle serves as the base line of the characters. In such a case, the variance calculated in step S28 (the variance of the shortest distances between the respective character regions and the upper edge of the smallest rectangle) becomes smaller than the variance calculated in step S27 (the variance of the shortest distances between the respective character regions and the lower edge of the smallest rectangle). Therefore, in such a case, the value of variable "Inverted" is incremented by one.

When, during the repeated execution of the processing in steps S23 to S33, the orientation judgment program 25 judges in steps S23 that the above-described processing has been completed for all the character strings contained in the name-card image, the orientation judgment program 25 proceeds to step S34. In step S34, the orientation judgment program 25 judges whether a significant difference is present between the count value of variable "Upright" and the count value of variable "Inverted." When having judged that a significant difference is present between the two count values, the orientation judgment program 25 proceeds to step S35. In step S35, the orientation judgment program 25 judges whether the count value of variable "Upright" is greater than the count value of variable "Inverted."

When having judged through the above-described judgment processing that the count value of variable "Upright" is greater than the count value of variable "Inverted," the orientation judgment program 25 judges that the name-card image selected to be subjected to processing is in an upright state (a state shown in FIG. 13*a*). Since the character string can undergo character recognition without rotation, the orientation judgment program 25 proceeds to step S36. In step S36, the orientation judgment program 25 performs processing for starting the character recognition program 28 in order to perform character recognition for the selected name-card image.

When having judged through the above-described judgment processing that the count value of variable "Upright" is less than the count value of variable "Inverted"; i.e., the count value of variable "Inverted" is greater than the count value of variable "Upright," the orientation judgment program 25 judges that the name-card image selected to be subjected to processing is in an inverted state (a state shown in FIG. 13*b*), and proceeds to step S37. After rotating the selected image by 180 degrees in order to bring the image into an upright state in step S37, the orientation judgment program 25 performs processing for starting the character recognition program 28 in order to perform character recognition for the rotated name-card image.

When having judged in step S34 that no significant difference is present between the count value of variable "Upright" and the count value of variable "Inverted," the orientation judgment program 25 judges that the judgment as to whether the character string is in an upright state or in an inverted state cannot be performed, for the reason that all the English characters that constitute the character string are capital letters, or for other reasons. In this case, the orientation judgment program 25 proceeds to step S38. In step S38, the orientation judgment program 25 performs processing for starting the second orientation judgment program 26.

As described above, the orientation judgment program 25 extracts character strings from each name-card image whose orientation has been corrected by the inclination correction program 24, and judges whether the base line of each character string is located on the upper side or lower side thereof, on the basis of variation in the shortest distances between the character region and the edge of a smallest rectangle surrounding the character string. On the basis of the results of judgment, the orientation judgment program 25 judges whether the name-card image is in an upright state or in an inverted state. When the name-card image is judged to be in an inverted state, the orientation judgment program 25 rotates the name-card image by 180 degrees.

The second orientation judgment program 26 is started when the orientation judgment program 25 cannot judge whether a name-card image is in an upright state or in an inverted state. For each of the character strings extracted by the orientation judgment program 25, the second orientation judgment program 26 performs character recognition on the assumption that the character string is in an upright state to thereby obtain evaluation values of recognized characters, and calculates an average (or total sum, etc.) of the evaluation values. Further, the second orientation judgment program 26 performs character recognition on the assumption that the character string is in an inverted state to thereby obtain evaluation values of recognized characters, and calculates an average (or total sum) of the evaluation values.

Subsequently, from the two average values (or total sum, etc.), the second orientation judgment program 26 judges whether each character string is in an upright state or in an inverted state; and aggregates the results of judgment for the individual character strings contained in the name-card image in order to judge whether the name-card image is in an upright state or in an inverted state. When the name-card image is judged to be in an upright state, the second orientation judgment program 26 starts the character recognition program 28 in order to perform character recognition for the selected name-card image. When the name-card image is judged to be in an inverted state, the second orientation judgment program 26 rotates the name-card image by 180 degrees to thereby bring it into an upright state and then starts the character recognition program 28 in order to perform character recognition for the selected name-card image.

Upon being started by the orientation judgment program 25 or the second orientation judgment program 26, the character recognition program 28 recognizes characters printed on the corresponding name card; i.e., characters contained in each name-card image which have been brought into an upright state by the orientation judgment program 25 or the second orientation judgment program 26, while referring to the dictionary data of the character recognition dictionary 27, which manages a list of printed items, such as name, company name, department, position, and address, which are possibly printed on name cards.

While using the results of the above character recognition, the name-card sorting program 30 determines the data item of each character string recognized by the character recognition program 28, with reference to dictionary data of the name-card sorting dictionary 29, which manages keywords regarding the printed items such as name, company name, department, position, and address, as well as attribute information (e.g., print position) used in printing of each item on the corresponding name card. Subsequently, according to the determined data item, the name-card sorting program 30 registers into the name card database 31 the character string recognized by the character recognition program 28. Thus, the name-card sorting program 30 having a data structure as shown in FIG. 4 is created.

For example, when "manager," "president," "director," or a like word serving as a keyword is contained in a character string, the character string is judged to represent a job position (managerial position), and is registered in the name card database 31 as a job position. When "LIMITED," "LTD," "INC," or a like word serving as a keyword is contained in a character string, the character string is judged to represent a company name, and is registered in the name card database 31 as a company name.

Although the present invention has been described with reference to the illustrated embodiment, the present invention is not limited thereto. For example, in the embodiment, the present invention has been described specifically for the case in which character strings printed on name cards are processed; however, application of the present invention is not limited to character strings printed on name cards. Further, in the embodiment, the present invention has been described specifically for the case in which English characters are subjected to character recognition; however, the application of the present invention is not limited to English characters. Moreover, in the embodiment, variation of the shortest distance between the edge of a smallest rectangle and each character region is detected by use of variance; however, other statistical values may be used.

INDUSTRIAL APPLICABILITY

As described above, the present invention employs a configuration such that when a string of characters, such as English characters, which produces a difference between vitiation in the envelope formed on the upper side of the character string and variation in the envelope formed on the lower side of the character string is subjected to character recognition, the orientation (upright or inverted) of the character string is detected through detection of the two variations, without use of character recognition. Thus, the orientation (upright or inverted) of a character string can be detected while minimizing the load imposed on a CPU. Further, the present invention enables accurate detection of the orientation (upright or inverted) of a character string to be subjected to character recognition, even when the character string is a string of characters, such as English characters, which include characters which, when rotated by 180 degrees assume shapes very similar to those of other characters.

What is claimed is:

1. A character-recognition pre-processing apparatus to detect whether a character string to be subjected to character recognition is in an upright state or in an inverted state, the apparatus comprising:

extraction means for extracting an image of a character string to be subjected to character recognition;

setting means for setting the smallest rectangle that surrounds the character string image extracted by the extraction means;

specifying means for specifying the position of each character within the smallest rectangle set by the setting means;

detection means for detecting, at each character position specified by the specifying means, the shortest distance between a character region and the lower edge of the smallest rectangle, and the shortest distance between the character region and the upper edge of the smallest rectangle; and judgment means for judging whether the character string extracted by the extraction means is in an upright state or an inverted state, on the basis of variations in the two shortest distances detected by the detection means.

2. A character-recognition pre-processing apparatus according to claim 1, wherein the specifying means specifies the positions of characters through detection of spaces present between the characters.

3. A character-recognition pre-processing apparatus according to claim 1, wherein the specifying means estimates a character width on the basis of a character height defined by the rectangle set by the setting means.

4. A character-recognition pre-processing apparatus according to any one of claims 1 to 3, wherein the judgement means judges the orientation of a character string in consideration of the fact that in some cases the orientation of a character string cannot be determined, depending on the attribute of characters contained in the character string.

5. A character-recognition pre-processing apparatus according to any one of claims 1 to 4 further comprising:

second judgment means which is operated when an image to be subjected to character recognition contains a plurality of character strings in order to judge the orientation of the image on the basis of information representing the orientations of the character strings judged by the judgement means.

6. A character-recognition pre-processing method to detect whether a character string to be subjected to character recognition is in an upright state or in an inverted state, the method comprising the steps of:

extracting an image of a character string to be subjected to character recognition;

setting the smallest rectangle that surrounds the character string image extracted;

specifying the position of each character within the smallest rectangle set in the step of setting;

detecting, at each character position specified, the shortest distance between a character region and the lower edge of the smallest rectangle, and the shortest distance between the character region and the upper edge of the smallest rectangle; and judging whether the character string extracted is in an upright state or an inverted state, on the basis of variations in the two shortest distances detected.

7. A program recording medium storing a program used to realize a character-recognition pre-processing apparatus to detect whether a character string to be subjected to character recognition is in an upright state or in an inverted state, wherein the program causes a computer to execute:

extracting an image of a character string to be subjected to character recognition;

setting processing for setting the smallest rectangle that surrounds the character string image extracted by the extraction;

specifying the position of each character within the smallest rectangle set by the setting;

detecting, at each character position specified by the specifying, the shortest distance between a character region and the lower edge of the smallest rectangle, and the shortest distance between the character region and the upper edge of the smallest rectangle; and judging whether the character string extracted by the extraction is in an upright state or an inverted state, on the basis of variations in the two shortest distances detected by the detection.

* * * * *

UNITED STATES PATENT AND TRADEMARK OFFICE

CERTIFICATE OF CORRECTION

PATENT NO. : 6,941,030 B2 
APPLICATION NO. : 09/889089
DATED : September 6, 2005
INVENTOR(S) : Hiroshi Kakutani et al.

It is certified that error appears in the above-identified patent and that said Letters Patent is hereby corrected as shown below:

Column 15, Line 20, delete “judgement” and insert - - judgment - - therefor.
Column 15, Line 26, delete “claims 1 to 4” and insert - - claims 1 to 3 - - therefor.
Column 15, Line 33, delete “judgement” and insert - - judgment - - therefor.

Signed and Sealed this

Fifteenth Day of August, 2006

JON W. DUDAS
*Director of the United States Patent and Trademark Office*